United States Patent [19]
Akrongold et al.

[11] 3,846,550
[45] Nov. 5, 1974

[54] COSMETIC SKIN POWDER CONTAINING UREA

[76] Inventors: Harold S. Akrongold; Rochelle Akrongold, both of 39 Cathay Rd., East Rockaway, L.I., N.Y. 11101

[22] Filed: Dec. 18, 1972

[21] Appl. No.: 315,883

Related U.S. Application Data

[63] Continuation-in-part of Ser. No. 108,616, Jan. 21, 1971, abandoned, which is a continuation-in-part of Ser. No. 809,042, March 20, 1969, abandoned.

[52] U.S. Cl..................................... 424/63, 424/69
[51] Int. Cl............................................. A61k 7/02
[58] Field of Search................................ 424/63, 69

[56] References Cited
UNITED STATES PATENTS
3,196,079   7/1965   Blaustein ............................. 424/63

OTHER PUBLICATIONS

Chemical Abstracts, Vol. 56 (1962), p. 13030h.

*Primary Examiner*—Vincent D. Turner
*Attorney, Agent, or Firm*—Arthur A. Jacobs

[57] ABSTRACT

A cosmetic and skin care powder consisting essentially of urea, an oil phase and an inorganic pigment, all of which are reacted to form the final product. The reactants comprise about 0.1–74.9 percent urea, about 0.1–60 percent oil phase and about 0.1–99.5 percent inorganic pigment.

3 Claims, No Drawings

COSMETIC SKIN POWDER CONTAINING UREA

This is a continuation-in-part of co-pending application Ser. No. 108,616, filed Jan. 21, 1971, now abandoned which is, itself, a continuation-in-part of application Ser. No. 809,042, filed Mar. 20, 1969 and now abandoned.

This invention relates to powders used for cosmetic and skin care purposes, and it particularly relates to products of this type which provide a simpler and more direct application as well as a more natural and, therefore, less artificial appearance on the skin than those heretofore available.

In accordance with the present invention, the basic ingredients of the composition comprise a mixture of urea, oil and an inorganic pigment. The pigment is a powdered substance which may be any one or a mixture of talc, aluminum, alumina, aluminum silicate, silica, iron oxide, ferric hydroxide, burned sienna, zinc oxide, titanium oxide, titanium dioxide, sodium aluminum silicate, calcium silicate, calcium carbonate, magnesium carbonate, manganese oxide, chrome oxide, sulfur, carbon black, clay, iron ores such as hematite, etc.

The inorganic components of the mixture provide the color or tint of the powder and, therefore, serve as pigmentation agents. Generally, these inorganic substances form a rough discontinuous film, similar to small overlapping plates, and it is this discontinuity which results in the artificial appearance. Heretofore, it was not possible to completely overcome this artificial appearance. However, by means of the present invention, whereby the inorganic substances are combined with the urea and oil, the resultant film is continuous and, therefore, a completely natural appearance is obtained. In fact, although the product is a powder, it exhibits the appearance of a liquid on the skin and feels like oil.

In addition to the aforesaid advantages of the present invention, it provides a product which is much simpler in application than those used heretofore. In this respect, it was heretofore necessary when applying make-up, to first apply a moisturizer, then a liquid make-up base consisting of inorganic pigments dispersed in an oil-in-water or water-in-oil emulsion, and finally a loose powder. These three products and three steps are eliminated by the present invention whereby the entire application takes place in one step and by means of a single product.

The oils which may be used to form these products include all fatty acids and fatty alcohols, saturated or unsaturated, straight or branched chain, wherein there are between 5 and 52 carbon atoms in the chain. Among the acids are oleic, stearic, myristic, undecylinic and isostearic acids, dimer acids such as "Empol 1014" (Emery Industries, Inc.) may also be used. It is also within the scope of the invention to use esters of fatty acids, such as isopropyl myristate, isopropyl palmitate, isopropyl linoleate, isopropyl isostearate, decyl oleate, decyl stearate, myristal myristate, hexadecyl stearate, etc. Among the fatty alcohols are oleyl, myristal, hexadecyl, etc., alcohols. Also lanolin alcohols such as "Super Hartolin" (Croda, Inc.) and lanolin itself. Other oils include castor oil, safflower oil, cottonseed oil, corn oil, olive oil, cod liver oil, and similar vegetable oils, mineral oils of all grades, carbowaxes such as "Carbowax 400" (Union Carbide), the "Ucon" fluids (Union Carbide) such as "Ucon LB 1715," and silicone fluids such as "Silicone 200" (Dow Corning). Also utilizable are such petroleum products as kerosene, particularly deodorized kerosene such as "Shell Sol".

The composition comprises about 0.1–74.9 percent by weight urea, about 0.1–60 percent by weight oil, and about 0.1–99.5 percent by weight inorganic pigment.

The following examples serve to illustrate the invention but are not intended to limit the invention except as claimed:

EXAMPLE 1

Body powder - five parts by weight of water are heated to 94°C. To the heated water are added 18 parts by weight urea. The mixture is agitated till the urea is completely dissolved. Then 77 parts by weight of anhydrous methanol are slowly stirred into the solution until the solution is clear. The solution is then chilled to 12°C and held at that temperature. In a separate vessel, the oil phase is prepared and consists of 85 parts by weight mineral oil ("Carnation 65/75"—Witco Chem. Co.) and 15 parts by weight decyl oleate ("Cerephyl 140A"—Van Dyke, Inc.). These are mixed at ambient temperature. To 100 parts by weight of the urea solution, at 12°C, are slowly added 6 parts by weight of the oil phase, with agitation. Agitation is maintained until a white precipitate forms. The mixture is then held for 8 minutes, after which 25 parts by weight of talc are added with agitation which is maintained for 10 minutes. The mixture is then filtered, using a pressure filter. The precipitate comprises a reaction product of urea, oil and talc with trace amounts of water and methanol which are removed by drying at 45°C for about 90 minutes. The dried product is then ground to the desired fineness in a hammer mill or the like.

The resulting body powder is smooth and fine and feels like a lotion on the skin. There are no dust problems during application as in the case of an ordinary body powder.

The body powder produced in the above manner can be used directly on the skin or may be placed in an aerosol can containing 5 gms. of body powder and 45 cc. of Freon (such as "Freon 12/114" which is a ratio of 40 parts by weight "Freon 12" and 60 parts by weight "Freon 114").

EXAMPLE 2

Make-up powder - 5 parts by weight of water are heated to 94°C. The water are added 18 parts by weight urea and then 77 parts by weight methanol, all with constant agitation until clear. The oil phase is separately prepared using 60 parts by weight mineral oil, 20 parts by weight decyl oleate, 5 parts by weight myristyl alcohol, 3 parts by weight isostearic acid, 4 parts by weight isopropyl palmitate, and 3 parts by weight olive oil. These are mixed at ambient temperature until clear. To 100 parts by weight of the urea solution is added 9 parts by weight of the oil phase at 10°C. The mixture is then stirred until a white precipitate forms. There is then added 15 parts by weight talc, 5 parts by weight kaolin, 5 parts by weight zinc oxide, 5 parts by weight titanium dioxide, and 4 parts by weight burned sienna. The mixture is then stirred for 20 minutes. It is, thereafter, filtered through a paper filter. The precipitate is dried at 60°C for 1 hour, and is then ground in a hammer mill.

The resultant product is a "3-in-1" make-up, meaning that it performs the triple functions of a moisturizer, liquid make-up and powder make-up.

EXAMPLE 3

Eye shadow — The same general procedure is used as in Example 2, except that there are 50 parts by weight of urea solution and 14 parts by weight of the oil phase. The oil phase here consists of 50 parts by weight mineral oil ("Kaydol" — Witco Chem. Co.), 30 parts by weight corn oil, 10 parts by weight decyl oleate, 5 parts by weight hexadecyl alcohol, 2 parts by weight lanolin alcohol ("Super Hartolan" — Croda, Inc.), and 3 parts by weight polyethylene glycol ("Carbowax 400" - Union Carbide). The pigment consists of 10 parts by weight zinc oxide, 10 parts by weight talc, 2 parts by weight alumina, 5 parts by weight titanium dioxide, and 5 parts by weight "ultramarine blue" (sodium aluminum silicate with some combined sulfur).

EXAMPLE 4

Foot powder - The same procedure is used as in Example 1 except that the oil phase consists of 50 parts by weight mineral oil and 50 parts by weight undecylinic acid.

EXAMPLE 5

Insect repellent powder - The same procedure is used as in Example 1 except that the oil phase consists of 70 parts by weight mineral oil and 30 parts by weight octylene glycol.

EXAMPLE 6

Make-up powder — The same procedure is used as in Example 2 except that the oil phase consists of 7.5 parts by weight decyl oleate, 7.5 parts by weight of an isopropyl ester of lanolin alcohols ("Amerlate P" — Amerchal, Inc.), and 85 parts by weight mineral oil. Also in the pigment, the burned sienna is replaced by an equivalent amount of brown ochre (umber).

The invention claimed is:

1. A cosmetic skin care powder composition consisting essentially of a precipitate formed by the reaction of about 0.1–74.9 percent by weight of urea in solution, about 0.1–60 percent by weight of an oil phase and about 0.1–99.5 percent by weight of an inorganic pigment, said urea solution and said oil phase being agitated in the presence of alcohol until a clear solution is obtained prior to admixture with the oil phase, said oil phase being selected from the group consisting of mineral oil, lanolin, lanolin alcohol, vegetable oil, silicon fluids, kerosene, polyalkylene glycol, saturated and unsaturated straight or branched chain fatty acids and dimer acids having between five and 52 carbon atoms, fatty alcohols and dimer alcohols having between five and 52 carbon atoms, esters of said fatty acids, and mixtures thereof.

2. The composition of claim 1 wherein the pigment is any one or a selected mixture of members of the group consisting of talc, aluminum, alumina, aluminum silicate, silica, iron oxide, ferric hydroxide, burned sienna, zinc oxide, titanium oxide, titanium dioxide, sodium aluminum silicate, calcium silicate, calcium carbonate, magnesium carbonate, manganese oxide, chrome oxide, sulfur, carbon black, clay and hematite.

3. The composition of claim 1 embodied in an aerosol formulation.

* * * * *